(12) United States Patent
Aziz et al.

(10) Patent No.: US 7,599,461 B2
(45) Date of Patent: Oct. 6, 2009

(54) METHOD AND APPARATUS FOR GENERATING ONE OR MORE CLOCK SIGNALS FOR A DECISION-FEEDBACK EQUALIZER USING DFE DETECTED DATA IN THE PRESENCE OF AN ADVERSE PATTERN

(75) Inventors: Pervez M. Aziz, Dallas, TX (US); Vladimir Sindalovsky, Perkasie, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 542 days.

(21) Appl. No.: 11/541,498

(22) Filed: Sep. 29, 2006

(65) Prior Publication Data

US 2008/0080610 A1    Apr. 3, 2008

(51) Int. Cl.
*H03D 3/24* (2006.01)
(52) U.S. Cl. .................. 375/373; 375/229; 375/230; 375/231; 375/232; 375/233; 375/371
(58) Field of Classification Search ......... 375/229–236, 375/371–376
See application file for complete search history.

(56) References Cited

U.S. PATENT DOCUMENTS

2005/0265440 A1* 12/2005 Sohn ..................... 375/233
2007/0253475 A1* 11/2007 Palmer ................... 375/229

* cited by examiner

*Primary Examiner*—Curtis B Odom
(74) *Attorney, Agent, or Firm*—Ryan, Mason & Lewis, LLP

(57) ABSTRACT

Methods and apparatus are provided for generating one or more clock signals for a decision-feedback equalizer using DFE detected data, in the presence of an adverse pattern, such as a Nyquist pattern. A received signal is sampled using a data clock and a transition clock to generate a data sample signal and a transition sample signal. A DFE correction is obtained for each of the data sample and transition sample signals to generate DFE detected data and a DFE transition data. The DFE detected data and DFE transition data are then applied to a phase detector that generates a signal to adjust a phase of one or more of the data clock and transition clock. One or more of said phase updates are modified by the present invention if said DFE detected data satisfies one or more predefined conditions. A number of mechanisms are disclosed for qualifying or modifying the DFE phase detector updates based on the detected data pattern.

20 Claims, 11 Drawing Sheets

FIG. 2

| $\hat{y}(n-1)$ | $\hat{y}(n-1/2)$ | $\hat{y}(n)$ | PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |

| $\hat{y}_d(n-1)$ | $\hat{y}_{dt}(n)$ | $\hat{y}_d(n)$ | DFE_PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |

900

1200

METHOD AND APPARATUS FOR GENERATING ONE OR MORE CLOCK SIGNALS FOR A DECISION-FEEDBACK EQUALIZER USING DFE DETECTED DATA IN THE PRESENCE OF AN ADVERSE PATTERN

CROSS-REFERENCE TO RELATED APPLICATIONS

The present application is related to U.S. patent application Ser. No. 11/356,690, entitled "Method and Apparatus for Adaptively Establishing a Sampling Phase for Decision-Feedback Equalization," and U.S. patent application Ser. No. 11/356,691, entitled "Method and Apparatus for Generating One or More Clock Signals for a Decision-Feedback Equalizer Using DFE Detected Data," each filed Feb. 17, 2006 and incorporated by reference herein.

FIELD OF THE INVENTION

The present invention relates generally to decision-feedback equalization (DFE) techniques, and more particularly, to techniques for oversampled phase detection in the presence of adverse patterns for a decision-feedback equalized signal.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. Thus, receivers must jointly equalize the channel, to compensate for such distortions, and decode the encoded signals at increasingly high clock rates. Decision-feedback equalization (DFE) is a widely-used technique for removing intersymbol interference and other noise. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously decided symbols.

In one typical DFE implementation, a received analog signal is sampled and compared to one or more thresholds to generate the detected data. A DFE correction, v(t), is subtracted in a feedback fashion to produce a DFE corrected signal w(t). The same clock, generated from the received signal by a clock and data recovery (CDR) circuit, is generally used to sample the incoming signal and for the DFE operation. Typically, the entire DFE loop correction must be performed within one baud period T before the next correction is needed. At very high data rates, however, it is difficult to design circuits that operate this fast or to make them very accurate. Consequently, a number of techniques have been proposed or suggested for precomputing the DFE terms. Since there is no DFE feedback loop, the process of generating the DFE "corrected" decisions can be pipelined. In such a DFE precomputation implementation, the DFE correction is not fed back to correct the received signal and the input to the CDR circuit is thus non-DFE detected data. Thus, the CDR circuit processes unequalized data that still contains channel impairments.

U.S. patent application Ser. No. 11/356,691, entitled "Method and Apparatus for Generating One or More Clock Signals for a Decision-Feedback Equalizer Using DFE Detected Data," discloses an oversampled phase detection architecture for clock and data recovery of a DFE equalized signal. While the disclosed architecture effectively generates one or more clock signals for a decision-feedback equalizer using DFE detected data for most scenarios, it has been observed that under certain conditions, an adverse combination of incoming data pattern and equalization can yield non-optimal phase updates.

A need therefore exists for methods and apparatus for generating one or more clock signals for a decision-feedback equalizer using DFE detected data in the presence of an adverse pattern, such as a Nyquist pattern.

SUMMARY OF THE INVENTION

Generally, methods and apparatus are provided for generating one or more clock signals for a decision-feedback equalizer using DFE detected data, in the presence of an adverse pattern, such as a Nyquist pattern. According to one aspect of the invention, a received signal is sampled using a data clock and a transition clock to generate a data sample signal and a transition sample signal. A DFE correction is obtained for each of the data sample and transition sample signals to generate DFE detected data and a DFE transition data. The DFE detected data and DFE transition data are then applied to a phase detector that generates a signal to adjust a phase of one or more of the data clock and transition clock. One or more of said phase updates are modified by the present invention if said DFE detected data satisfies one or more predefined conditions.

A number of mechanisms are disclosed for qualifying or modifying the DFE phase detector updates based on the detected data pattern. For example, the modification can comprise suppressing one or more of the phase updates. The suppression of phase updates can optionally be limited to when the DFE detected data resulted from a DFE correction. The suppression of phase updates can also optionally be performed for a current bit and a next bit (e.g., regardless of whether the next bit is part of a Nyquist pattern). In a further variation, the modification of phase updates can comprise generating the one or more phase updates of one or more of the data clock and the transition clock based on the DFE detected data and non-DFE transition data. Alternatively, the thresholds used to latch one or more of the data sample signal and the transition sample signal can be set to zero if the DFE detected data satisfies one or more predefined conditions.

A more complete understanding of the present invention, as well as further features and advantages of the present invention, will be obtained by reference to the following detailed description and drawings.

BRIEF DESCRIPTION OF THE DRAWINGS

FIG. 2 is a table characterizing the input/output relationship of the BBPD of FIG. 1;

DETAILED DESCRIPTION

The present invention provides methods and apparatus for generating one or more clock signals for a decision-feedback equalizer using DFE detected data in the presence of an adverse pattern, such as a Nyquist pattern. If a predefined adverse pattern is detected, the DFE phase detector phase update that is sent to the rest of the clock and data recovery system is modified. For example, the modification can include suppressing the undesired phase update or substituting the phase update with an alternate phase update. In this manner, non-optimal phase updates are not processed by the clock and data recovery system in the presence of a predefined adverse pattern. Jitter tolerance is thus improved in the presence of a predefined adverse pattern.

Figure 1:
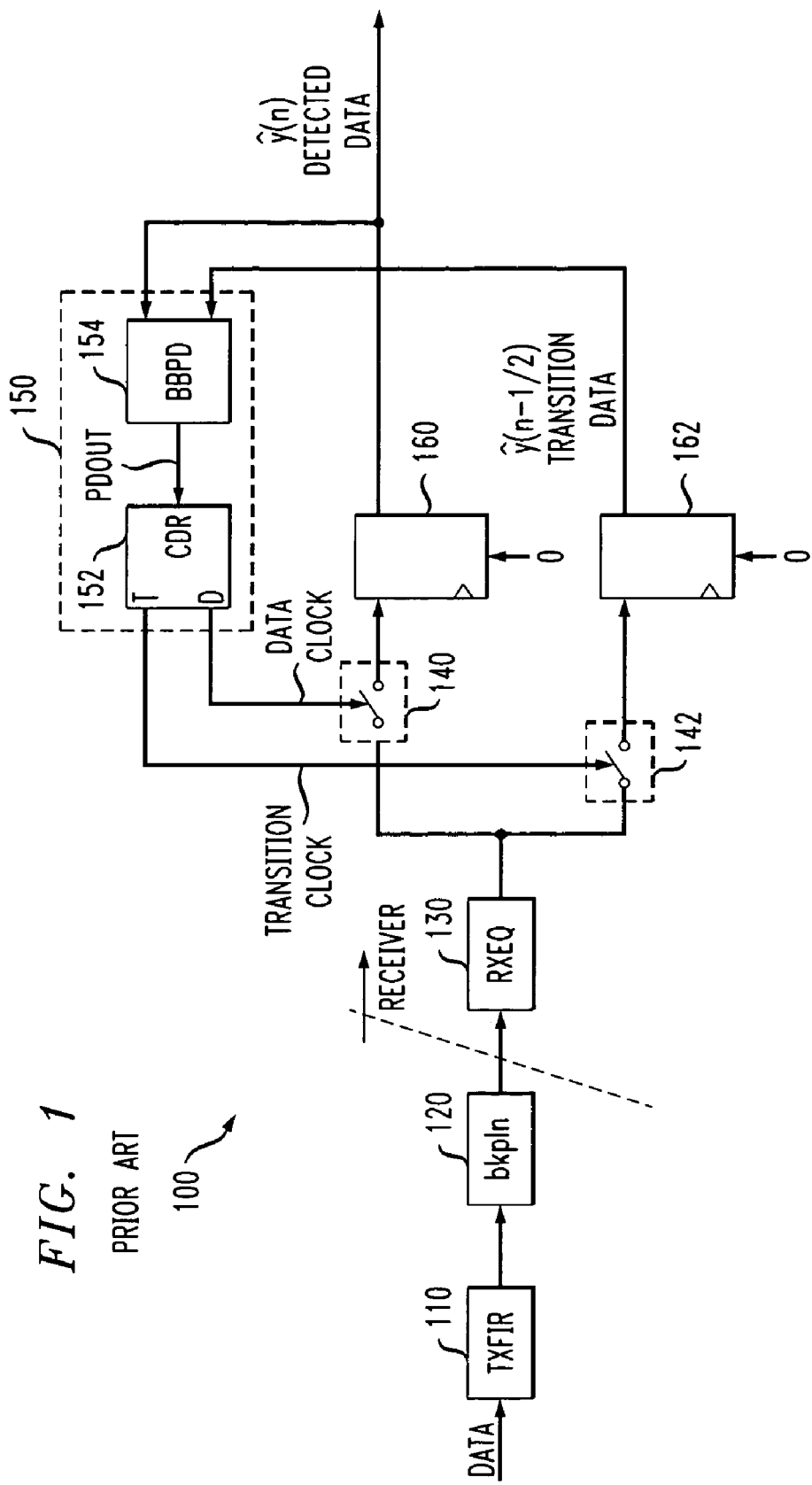
FIG. 1 is a block diagram of a conventional serializer/deserializer communication channel having a channel impairment.

FIG. 1 is a block diagram of a conventional serializer/deserializer communication channel 100 having a channel impairment that is due, for example, to a physical transmission medium, such as a backplane or drive head in a magnetic recording system. In the exemplary implementation shown in FIG. 1, the data is transmitted through a backplane channel 120 after optionally being equalized or filtered through a transmit FIR filter (TXFIR) 110. After passing though the backplane 120, the analog signal may optionally be filtered or equalized by a receive equalizer (RXEQ) 130 which may consist, for example, of a continuous time filter. The analog signal out of the RXEQ 130 is sampled at the baud rate by a switch 140 using a sampling clock generated by a clock/data recovery (CDR) circuit 150. A data detector 160 (or a slicer) digitizes the sample and compares the digitized sample to an exemplary threshold of zero, using the CDR recovered clock.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a data detector 160, the data is recovered properly despite the fact that the phase and frequency of the transmitted signal is not known. The CDR 150 is often an adaptive feedback circuit and the feedback loop must adjust the phase and frequency of the nominal clock to produce a modified recovered clock that can sample the analog waveform to allow proper data detection.

As previously indicated, the data detector 160 can be implemented as a slicer (i.e., a decision device based on an amplitude threshold) or a more complicated detector such as a sequence detector. For high speed applications, the data detector 160 is often implemented as a slicer that is clocked by the CDR clock. In addition to sampling the data signal, the slicer 160 essentially quantizes the signal to a binary "1" or "0" based on the sampled analog value and a slicer threshold, $s_t$. If the input to the slicer 160 at time n is w(n), then the output, ŷ(n), of the slicer 160 is given as follows:

$$\hat{y}(n) = 1 \text{ if } w(n) > s_t \quad (1)$$
$$= 0 \text{ otherwise}$$

In general, the CDR 150 may be composed of several components, such as a phase detector (PD), a loop filter, and a clock generation circuit. As shown in FIG. 1, the exemplary CDR 150 is comprised of a loop filter 152 embodied as a digital loop filter (CDR loop filter and clock generation) and a phase detector 154 embodied as a bang-bang phase detector (BBPD). For a discussion of bang-bang phase detector, see, for example, J. D. H. Alexander, "Clock Recovery from Random Binary Signals," Electronics Letters, 541-42 (October, 1975), incorporated by reference herein.

The BBPD 154 processes several quantities to compute an estimate of timing adjustment needed to properly sample the signal, in a known manner. The timing adjustment is filtered by the loop 152 before adjusting the phase of the sampling clocks. For the BBPD 154, there needs to be two sampling clocks: a data sampling clock which samples the recovered data and a transition sampling clock that is offset from the data clock by half a baud period $$\frac{T}{2}$$

and which samples the "transition" data. The transition sample data is denoted as ŷ(n−½) to indicate that it is sampled relative to ŷ(n) by a phase offset of $$\frac{T}{2}.$$

In addition, the BBPD 154 makes use of a one baud period delayed version of the recovered data. The delayed data is ŷ(n−1) (not shown explicitly in FIG. 1). Generally, the delayed data, ŷ(n−1), can be created internally by the BBPD 154 from ŷ(n). The BBPD input/output relationship is characterized by the look up table 200 shown in FIG. 2. Since the BBPD 154 requires more than one sample per baud period, the BBPD 154 is classified as an oversampled phase detector.

DFE Background

As data rates increase for serializer/deserializer applications, the channel quality degrades and the use of decision feedback equalization (DFE) in conjunction with finite impulse response (TXFIR) and receive equalization (RXEQ) filtering will be required to achieve the bit error rate (BER) performance required by more and more demanding applications. Note that the FIR function of the transmitter (TX) might be moved from the transmitter to the receiver (RX) and incorporated into the RXEQ function.

Figure 3:
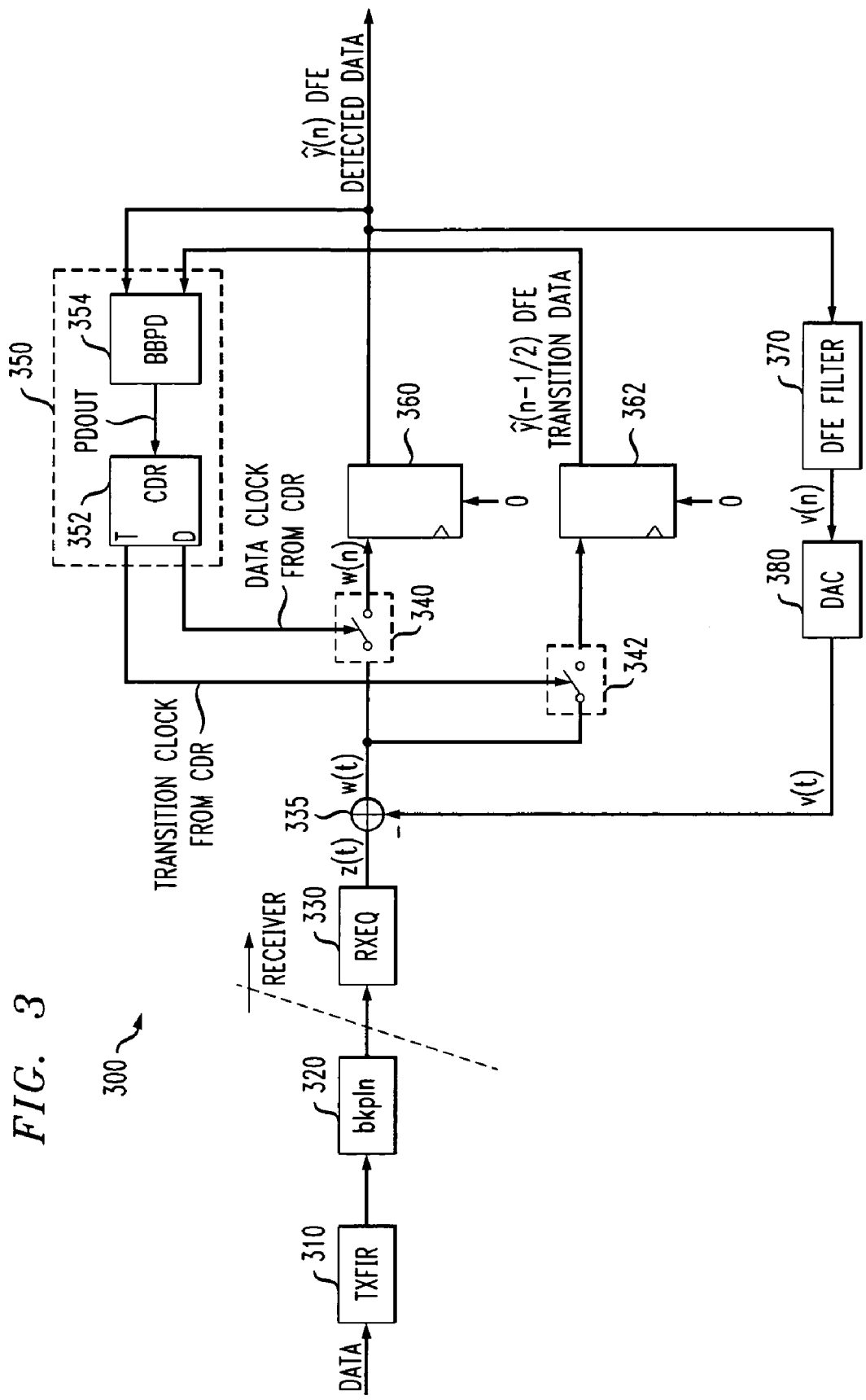
FIG. 3 is a block diagram of a serializer/deserializer communication channel incorporating a traditional DFE based equalizer.

FIG. 3 is a block diagram of a serializer/deserializer communication channel 300 that incorporates a traditional DFE based equalizer in addition to the TX and RX equalization of FIG. 1. As shown in FIG. 3, the data is transmitted through a backplane channel 320 after optionally being equalized or filtered through a transmit FIR filter (TXFIR) 310. After passing though the backplane 320, the analog signal may optionally be filtered or equalized by a receive equalizer (RXEQ) 330 which may include, for example, of a continuous time filter. The analog signal out of the RXEQ 330 is sampled at the baud rate by a switch 340 using a sampling clock generated by a clock/data recovery (CDR) circuit 352, in a similar manner to FIG. 1.

As discussed hereinafter, a DFE correction, v(t), generated by a DFE filter 370 and digitized by a digital-to-analog converter 380 is subtracted by an analog summer 335 from the output, z(t), of the RXEQ 330 to produce a DFE corrected signal w(t).

$$w(t)=z(t)-v(t) \quad (2)$$

Then, the signal w(t) is sampled by a switch 340:

$$w(n)=w(nT) \quad (3)$$

with T being the baud period. The sampled signal w(n) is then sliced by a slicer 360 to produce the detected data ŷ(n). The slicer output in turn is used to produce the filtered DFE output v(n) which is converted by the DAC 380 to the continuous time signal v(t). The DFE filter output 380 is given by:

$$v(n) = \sum_{l=1}^{L} b(l)\hat{y}(n-l) \quad (4)$$

where b(1) represents the coefficients of the L tap DFE.

As discussed above in conjunction with FIG. 1, the BBPD 354 typically requires two sampling clocks: a data sampling clock which samples the recovered data and a transition sampling clock that is offset from the data clock by half a baud period $$\frac{T}{2}$$

and which samples the "transition" data. The analog signal out of the RXEQ 330 is sampled at the baud rate by a switch 342 using the transition clock. The sampled signal w(n) is also sliced by a second slicer 362 to produce the detected data ŷ(n-½). The transition sample data is denoted as ŷ(n-½) to indicate is sampled relative to ŷ(n) by a phase offset of $$\frac{T}{2}.$$

It is noted that the DFE filter 370 uses as its input past data decisions starting at y(n-1) and earlier. The DFE filter 370 does not use the current decision ŷ(n). Since an analog representation, w(t), of the DFE signal exists, it can be sampled directly by both the data clock using switch 340 (to produce w(n)) and the transition clock using switch 342 and these sampled latched signals can drive a traditional BBPD 354.

For this circuit 300 to work, the entire DFE loop correction is performed within one baud period T before the next correction is needed. At very high data rates, it is difficult to design circuits that operate this fast or to make them very accurate.

Consequently, a well known technique may be employed whereby the DFE terms are "precomputed" and chosen based upon the amplitude value of y(n). Since there is no DFE feedback loop, the process of generating the DFE "corrected" decisions can be pipelined.

Figure 4:
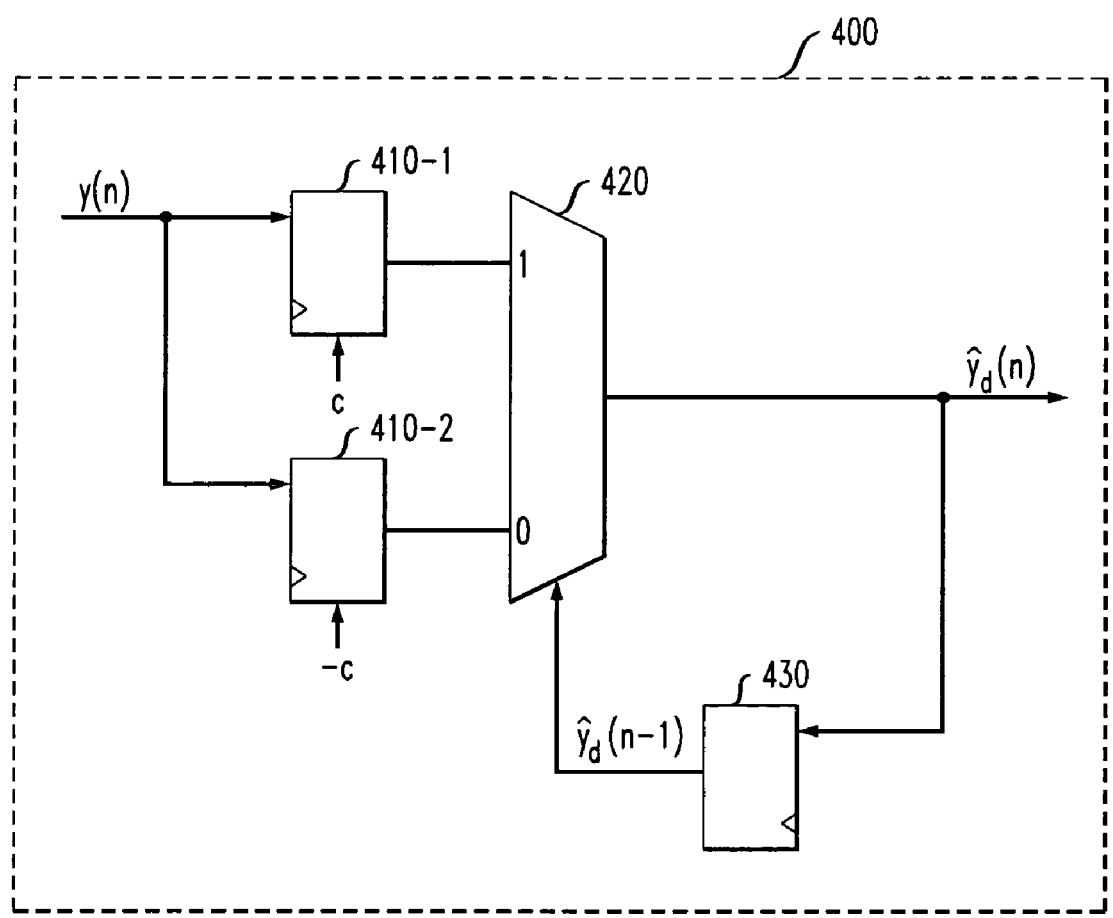
FIG. 4 illustrates an exemplary DFE logic implementation for DFE data.

FIG. 4 illustrates an exemplary DFE logic implementation 400 for a M=1 tap DFE making use of a DFE coefficient b(1). For simplicity of notation, b(1) is denoted by the variable c. The decisions from the DFE slicer latches 410-1, 410-2 (latches with threshold of c and -c, respectively) are combined with the previous DFE detected bit decision, $\hat{y}_d(n-1)$ (represented by the arrow fed back into the DFE logic block) to produce the final DFE corrected decision $\hat{y}_d(n)$. The DFE path computation logic can be pipelined thereby eliminating the bottleneck of having to complete the computation in one baud period. The DFE logic appropriately selects from the pre-computed decisions, which are the outputs of the latches with thresholds c and -c, using the multiplexer 420 based on the past decision $\hat{y}_d(n-1)$.

For the case when $\hat{y}_d(n-1)=1$, $$\hat{y}_d(n) = 1 \text{ if } y(n) > c \quad (5)$$
$$= 0 \text{ if } y(n) < c \quad (6)$$

For the case when $\hat{y}_d(n-1)=0$, $$\hat{y}_d(n) = 1 \text{ if } y(n) > -c \quad (7)$$
$$= 0 \text{ if } y(n) < -c \quad (8)$$

Figure 5:
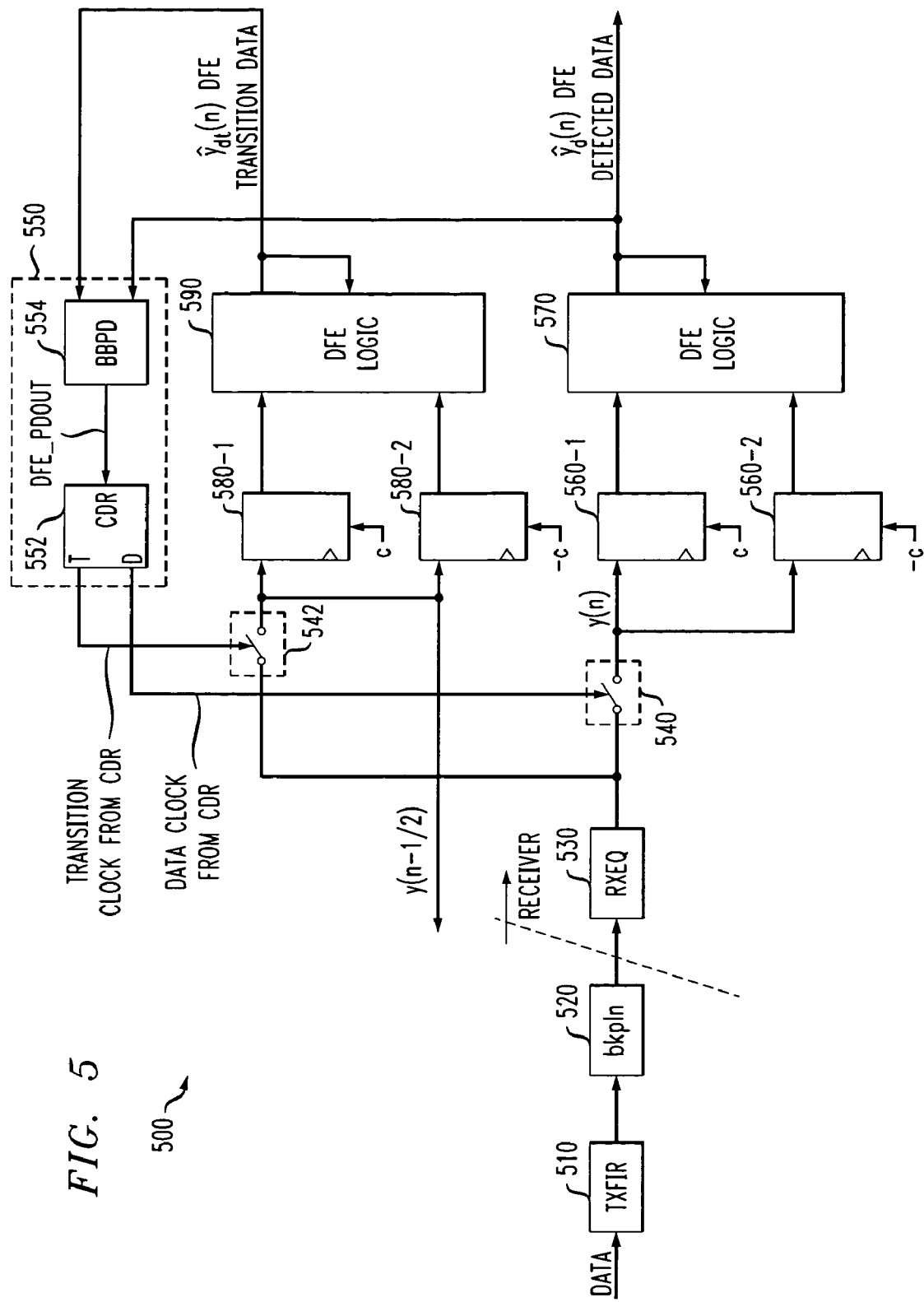
FIG. 5 is a block diagram of a serializer/deserializer communication channel incorporating precomputation of the DFE terms.

FIG. 5 is a block diagram of a serializer/deserializer communication channel 500 that incorporates precomputation of the DFE terms, in addition to the TX and RX equalization of FIGS. 1 and 3. The exemplary embodiment shown in FIG. 5 is for a one tap (L=1) DFE that makes use of a DFE coefficient b(1). For simplicity of notation, b(1) is denoted by the variable c.

As shown in FIG. 5, the data is transmitted through a backplane channel 520 after optionally being equalized or filtered through a transmit FIR filter (TXFIR) 510. After passing though the backplane 520, the analog signal may optionally be filtered or equalized by a receive equalizer (RXEQ) 530. The analog output of the RXEQ 530 is sampled at the baud rate by switches 540, 542. The switch 540 uses a data clock generated by the clock/data recovery circuit 552 and switch 542 uses a transition clock generated by the clock/data recovery circuit 552, in a similar manner to FIG. 3.

As shown in FIG. 5, exemplary latches 560-1 and 560-2 having thresholds of c and -c, respectively, are used to generate a decision for the DFE equalized signal. The decisions from the DFE slicer latches 560 are combined by the DFE logic 570 with the previous DFE detected bit decision, $\hat{y}_d(n-1)$ (represented in FIG. 5 by the arrow fed back into the DFE logic block 570) to produce the final DFE corrected decision $\hat{y}_d(n)$. The DFE path computation logic can be pipelined thereby eliminating the bottleneck of having to complete the computation in one baud period. The DFE logic 570 selects from the pre-computed decisions, which are the outputs of the latches 560 with thresholds c and -c, based on the past decision $\hat{y}_d(n-1)$.

In addition, the channel 500 includes latches 580-1 and 580-2, and DFE logic 590, for the creation of the DFE transition data. The DFE transition data is created as follows:

For the case when $\hat{y}_{dt}(n-1)=1$, $$\hat{y}_{dt}(n) = 1 \text{ if } y(n-1/2) > c \quad (9)$$
$$= 0 \text{ if } y(n-1/2) < c \quad (10)$$

For the case when $\hat{y}_{dt}(n-1)=0$, $$\hat{y}_{dt}(n) = 1 \text{ if } y(n-1/2) > -c \quad (11)$$
$$= 0 \text{ if } y(n-1/2) < -c \quad (12)$$

where $y(n-\frac{1}{2})$ represents the amplitude of the non-DFE transition sampled data.

Figures 6, 7:
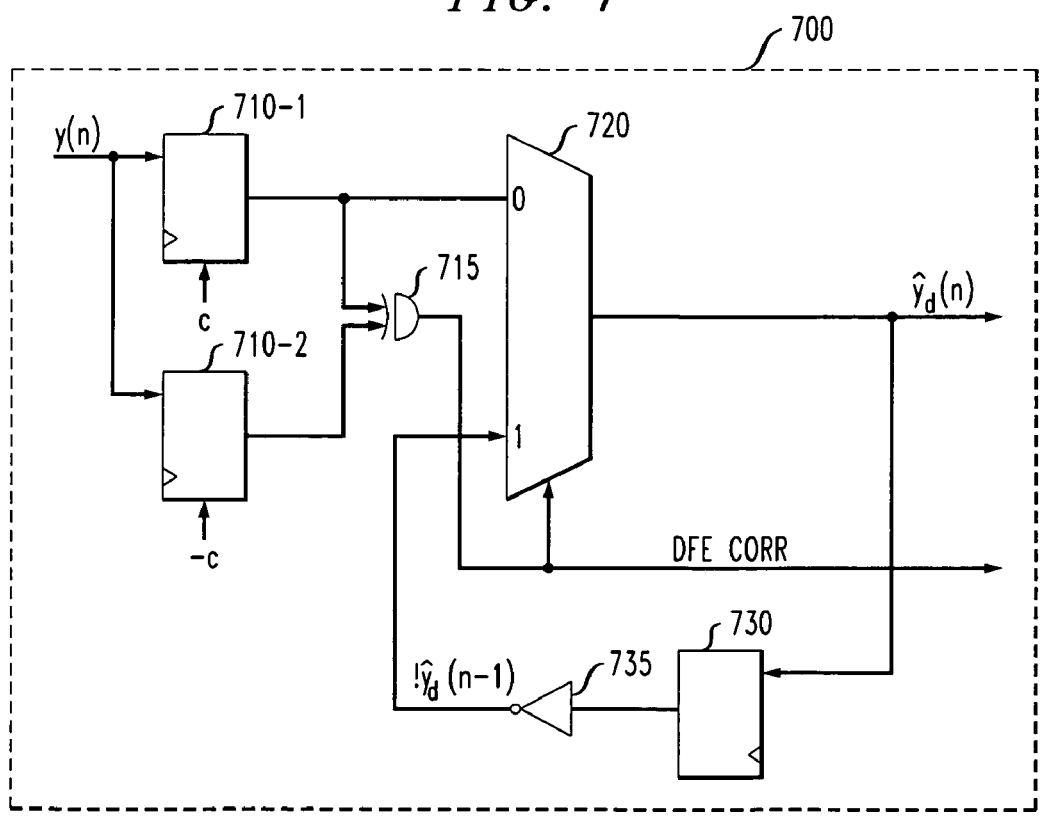
FIG. 6 is a sample truth table for the exemplary DFE equalized BBPD of FIG. 5.
FIG. 7 illustrates an alternative exemplary DFE logic implementation for DFE data that implements a DFE correction.

FIG. 6 is a sample truth table 600 for the exemplary DFE equalized BBPD 554 of FIG. 5. Generally, the truth table 600 remains the same as above, but is now driven by the DFE detected data $\hat{y}_d(n)$ as well as the synthesized DFE transition data $\hat{y}_{dt}(n)$ created in the manner described above.

As indicated above, the methods and apparatus disclosed in U.S. patent application Ser. No. 11/356,691, entitled Method and Apparatus for Generating One or More Clock Signals for a Decision-Feedback Equalizer Using DFE Detected Data," for performing clock and data recovery using the oversampled DFE phase detector work well in most scenarios, it has been observed that under certain conditions, an adverse combination of incoming data pattern and equalization can yield non-optimal phase updates. The adverse data patterns typically begin with a 1T or Nyquist pattern of the form 1010 ... (or its complement). If the equalization is such that the amplitude level for such an alternating pattern falls below the DFE coefficient threshold, c, then resulting alternating values for both $\hat{y}_{dt}(n)$, $\hat{y}_d(n)$ result in an undesirable output from the BBPD table 600 of FIG. 6. Such behavior would be harmful for the CDR performance if the Nyquist pattern were of a long duration. The present invention detects the presence of the Nyquist pattern and qualifies the DFE phase detector's phase update decision in a number of possible ways to minimize the impact from any undesirable phase updates.

FIG. 7 illustrates an alternative exemplary DFE logic implementation 700 for a M=1 tap DFE making use of a DFE coefficient b(1). For simplicity of notation, b(1) is denoted by the variable c. The DFE logic 700 comprises DFE slicer latches 710-1, 710-2 (latches with threshold of c and −c, respectively), an exclusive or gate 715, a multiplexer 720, latch 730 and a buffer 735. The mathematical description of the DFE logic 700 is given below $$\hat{y}_d(n) = 1 \text{ if } y(n) > c \quad (13)$$
$$= 0 \text{ if } y(n) < -c \quad (14)$$
$$= !\hat{y}_d(n-1) \text{ otherwise}$$

It is noted that a decision is considered to be DFE corrected or qualified when the third condition holds as it represents a transition from a 1 to −1 (or vice-versa) where the current decision was made by complementing the prior DFE decision, as indicated by the DFE_CORR signal in FIG. 7.

Pattern Qualification

As previously indicated, the present invention provides a number of mechanisms for qualifying or modifying the DFE phase detector updates based on the detected data pattern.

Nyquist Pattern Suppression

Figure 8:
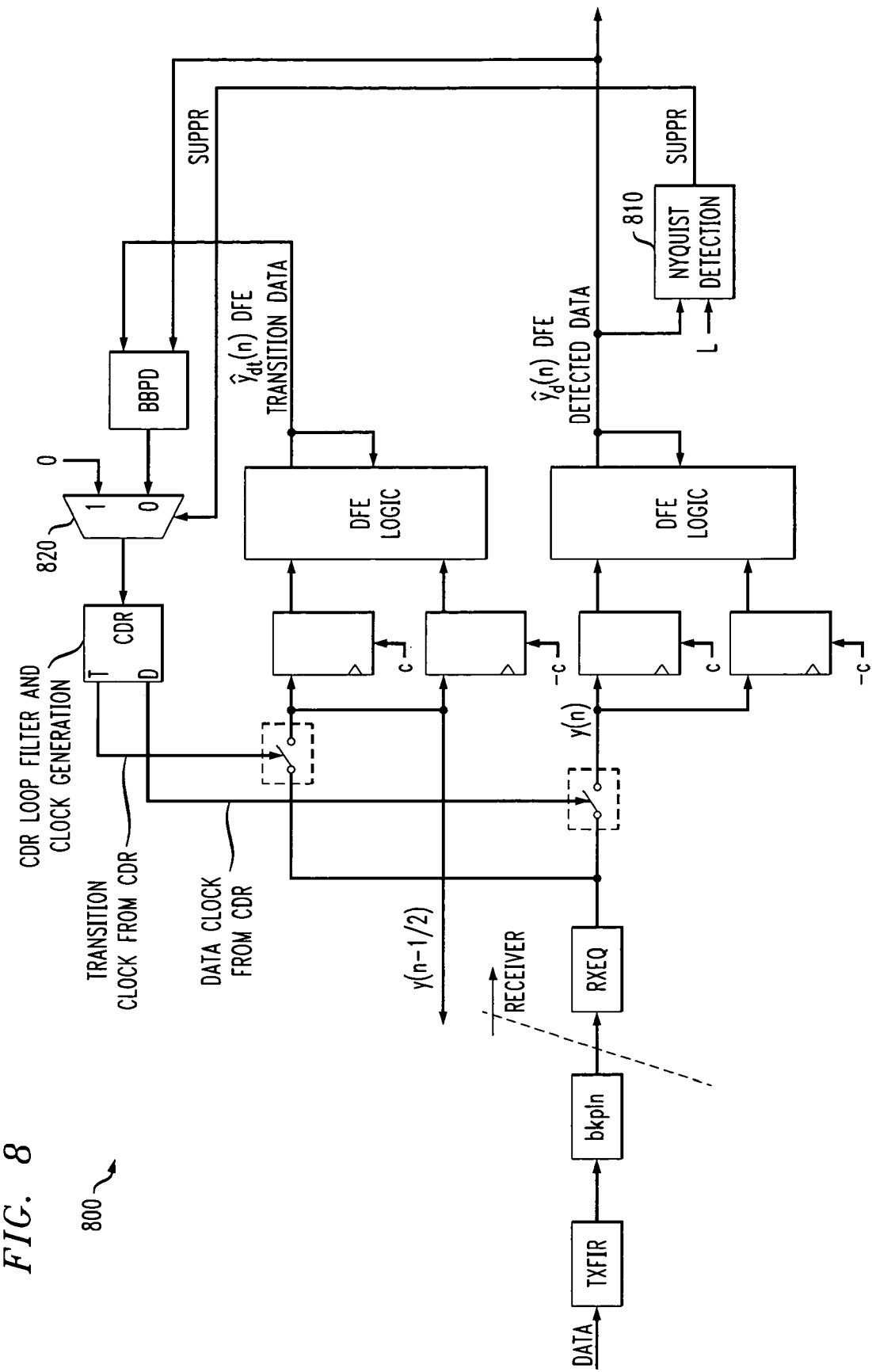
FIG. 8 is a block diagram of a serializer/deserializer communication channel that incorporates phase detector pattern qualification based on Nyquist suppression.

FIG. 8 is a block diagram of a serializer/deserializer communication channel 800 that incorporates phase detector pattern qualification based on Nyquist suppression. The embodiment of FIG. 8 extends the channel 500 of FIG. 5 to include a Nyquist pattern detector 810 that generates a suppression control signal, SUPPR, upon detecting a Nyquist pattern. The suppression control signal controls the operation of a multiplexer 820 that selects a value of 0 at input 1 whenever a Nyquist pattern is detected, and thereby cancel or suppress the phase update. The other elements of FIG. 8 operate in the same manner as the corresponding element in FIG. 5.

In the embodiment of FIG. 8, the DFE phase detector phase updates to the DFE CDR loop filter are suppressed (or set to 0) by the multiplexer 820 whenever the Nyquist pattern detector 810 detects tha the DFE detected data $\hat{y}_d(n)$ indicates the presence of Nyquist pattern of some duration L. For example, for L=3, when the data sequence "010" or "101" is detected in the $\hat{y}_d(n)$ data stream, phase updates to the CDR are suppressed or set to 0 until this pattern is no longer detected. As another example, for L=5, detection of the data sequences "01010" or "10101" results in initiating the suppression of the phase updates.

When the suppression control signal, SUPPR, is enabled as determined by the Nyquist detector 810 based on L bit detection, instead of the normal BBPD phase detector outputs being sent to the rest of the CDR, the output is suppressed and zeros from the "1" input of the multiplexer 820 are sent to the CDR. Likewise, when the Nyquist detector 810 determines that the Nyquist pattern is no longer present, the SUPPR signal is disabled, thereby allowing normal BBPD phase updates from the "0" input of the multiplexer 820 to reach the rest of the CDR.

Nyquist Pattern Substitution

Figure 9:
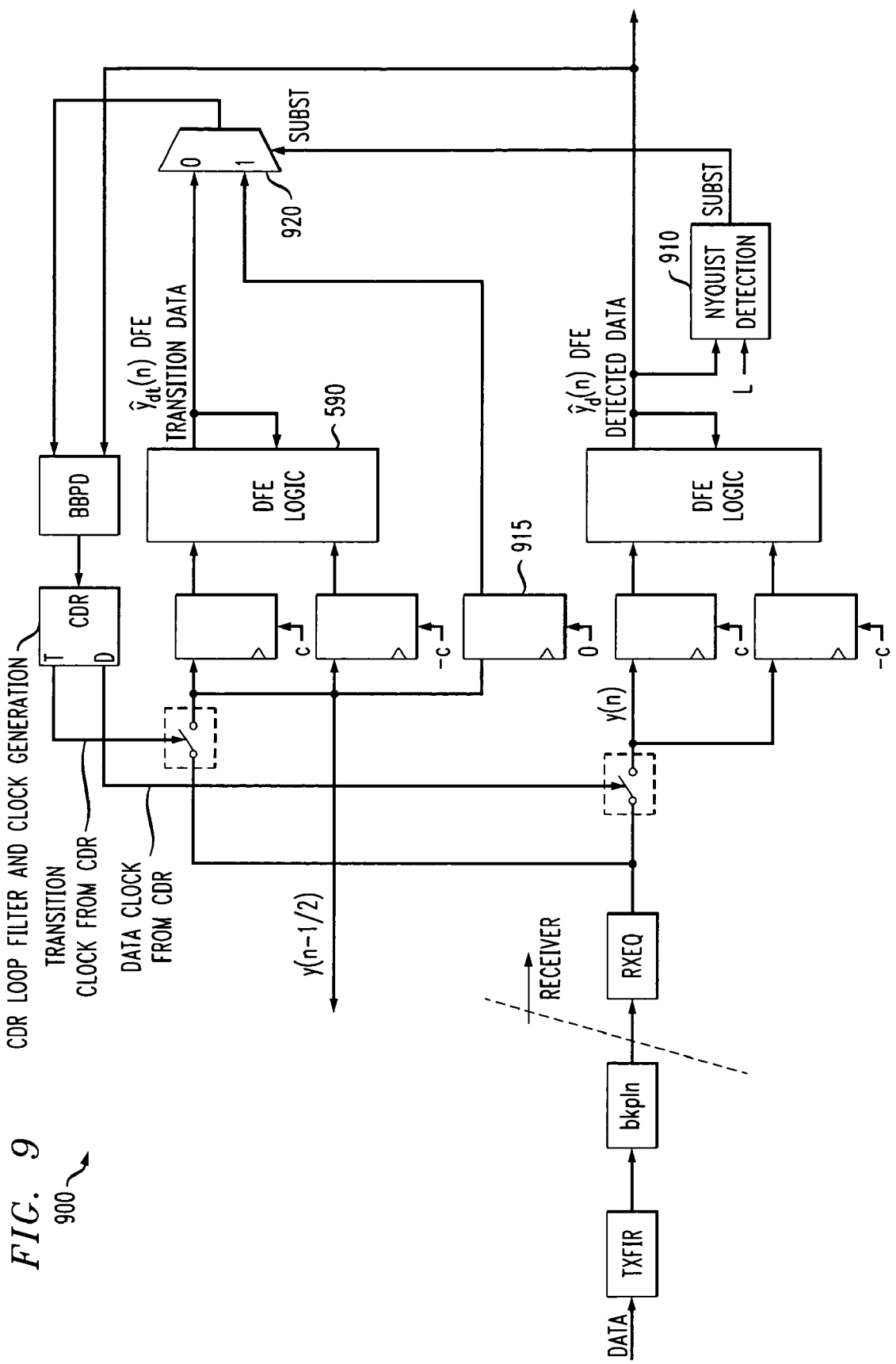
FIG. 9 is a block diagram of a serializer/deserializer communication channel that incorporates phase detector pattern qualification based on Nyquist substitution.

FIG. 9 is a block diagram of a serializer/deserializer communication channel 900 that incorporates phase detector pattern qualification based on Nyquist substitution. The embodiment of FIG. 9 extends the channel 500 of FIG. 5 to include a Nyquist pattern detector 910 that generates a substitution control signal, SUBST, upon detecting a Nyquist pattern. The substitution control signal controls the operation of a multiplexer 920 that selects non-DFE transition data at input 1 whenever a Nyquist pattern is detected, and thereby substitutes the data used to compute the phase update. The non-DFE transition data is generated by a latch 915 having a threshold of zero. The other elements of FIG. 9 operate in the same manner as the corresponding element in FIG. 5.

In the embodiment of FIG. 9, when the Nyquist pattern is detected by the detector 910, the BBPD generates a phase update based on the DFE detected data (as done in a normal operating mode) and the non-DFE transition data generated by the latch 915, instead of the DFE transition data generated by DFE logic 590. When the Nyquist pattern is detected by the detector 910, the detector 910 enables the SUBST signal which then selects the non-DFE transition data (based on latch threshold of zero) at the multiplexer 920 instead of the DFE transition data into the BBPD. When the Nyquist detector 910 determines that the Nyquist pattern is no longer present, the detector 910 disables the SUBST signal thereby allowing the normal DFE transition decisions to be sent to the BBPD.

DFE Qualified Nyquist Pattern Suppression

Figure 10:
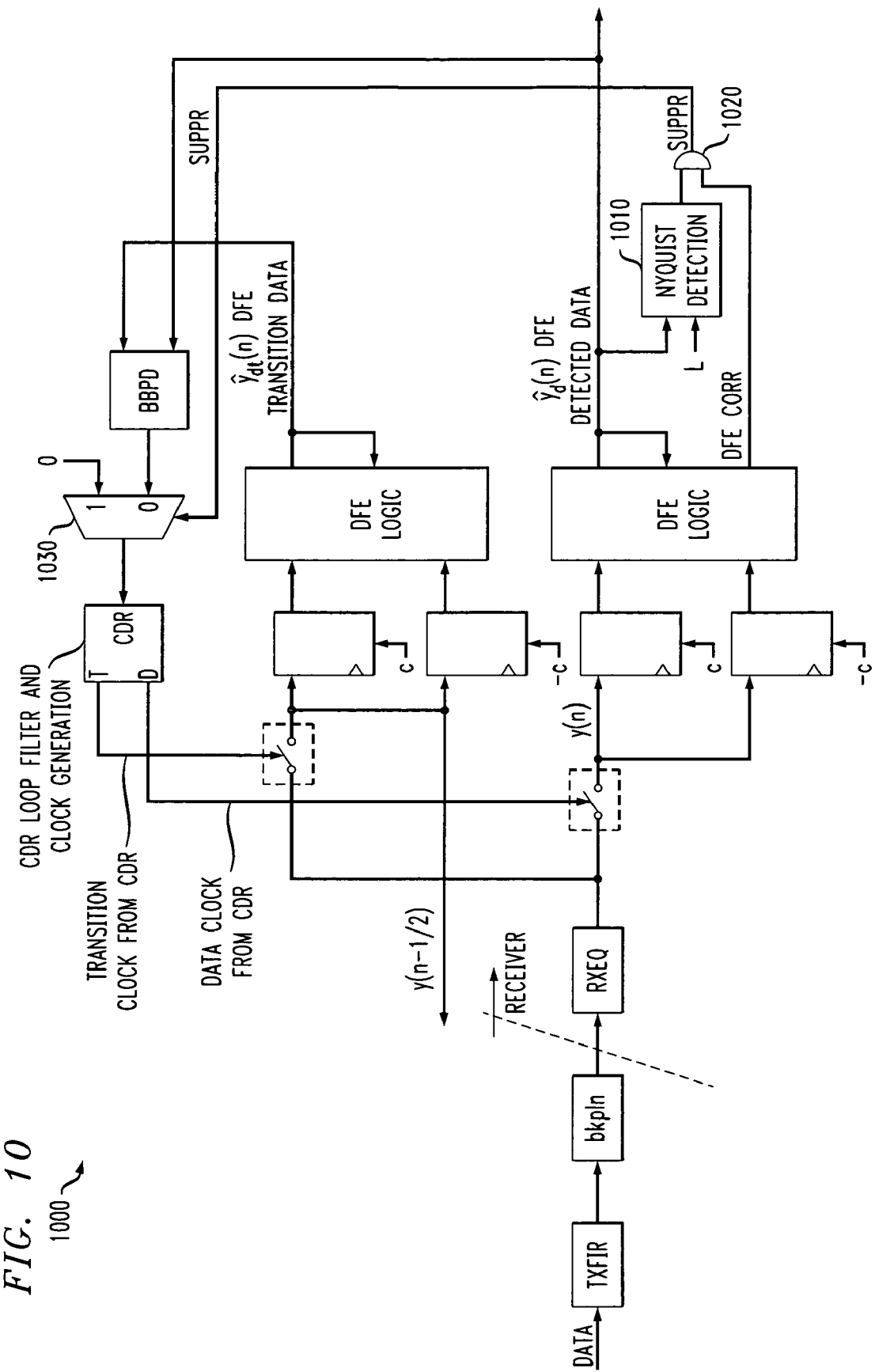
FIG. 10 is a block diagram of a serializer/deserializer communication channel that incorporates phase detector pattern qualification based on Nyquist suppression qualified by DFE correction.

FIG. 10 is a block diagram of a serializer/deserializer communication channel 1000 that incorporates phase detector pattern qualification based on Nyquist suppression qualified by DFE correction. The embodiment of FIG. 10 extends the channel 500 of FIG. 5 to include a Nyquist pattern detector 1010 that generates a suppression control signal, SUPPR, upon detecting a Nyquist pattern, only if a DFE correction signal, DFE_CORR, is also enabled, as detected by an AND gate 1020. The suppression control signal controls the operation of a multiplexer 1030 that selects a value of 0 at input 1 whenever the suppression control signal is enabled, and thereby cancels or suppresses the phase update. The other elements of FIG. 10 operate in the same manner as the corresponding element in FIG. 5.

In the embodiment of FIG. 10, Nyquist pattern suppression is thus performed only when the DFE detected data resulted from having to have made a DFE correction as determined by the DFE logic and shown by the DFE_CORR signal. This effectively means that Nyquist patterns with large amplitudes which would exceed the DFE threshold c, would not undergo DFE correction, hence, would not exhibit the problem being solved by the invention and thus would not necessitate the suppression of phase updates to the CDR. The Nyquist detection and the DFE_CORR signal are applied to an AND gate 1020 to generate the SUPPR signal.

DFE Qualified Nyquist Pattern Suppression with Next Bit Suppression

Figure 11:
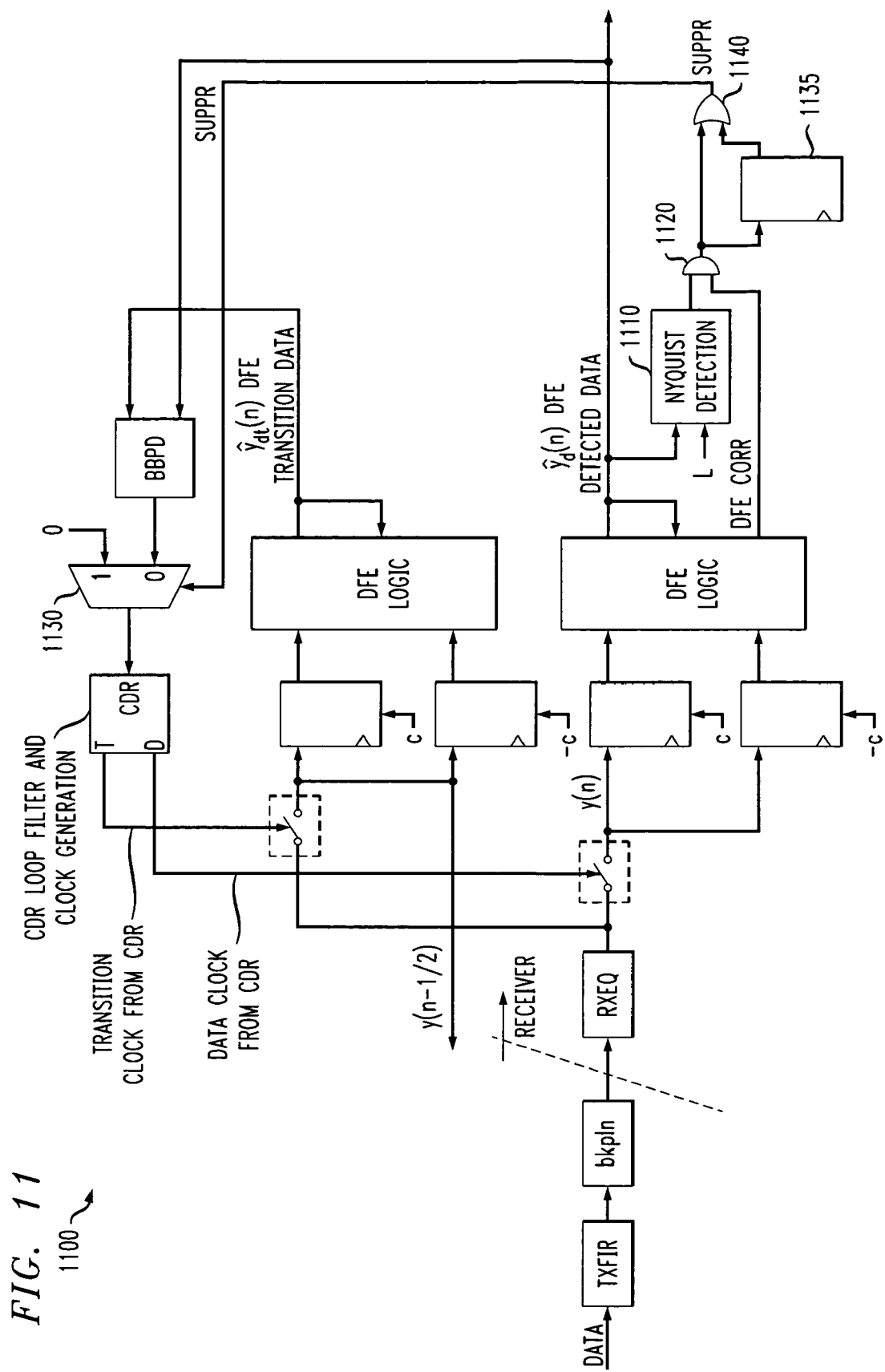
FIG. 11 is a block diagram of a serializer/deserializer communication channel that incorporates phase detector pattern qualification based on Nyquist suppression qualified by DFE correction with next bit suppression.

FIG. 11 is a block diagram of a serializer/deserializer communication channel 1100 that incorporates phase detector pattern qualification based on Nyquist suppression qualified by DFE correction with next bit suppression. The embodiment of FIG. 11 extends the channel 1000 of FIG. 10 to include next bit suppression. A Nyquist pattern detector 1110 generates a suppression control signal, SUPPR, upon detecting a Nyquist pattern. A DFE correction signal, DFE_CORR, is enabled when a DFE correction is performed. The Nyquist detection and the DFE_CORR signal are applied to an AND gate 1120. The channel 110 also includes logic 1135, 1140 to implement next bit suppression, as discussed below. The suppression control signal controls the operation of a multiplexer 1130 that selects a value of 0 at input 1 whenever the suppression control signal is enabled, and thereby cancel or suppress the phase update. The other elements of FIG. 11 operate in the same manner as the corresponding element in FIG. 10.

In the embodiment of FIG. 11, the DFE correction qualified Nyquist suppression of FIG. 10 is extended by suppressing the phase update corresponding with the current bit, as above, as well as suppressing the phase update corresponding to the next bit as well regardless of whether that next bit may have been part of a Nyquist pattern bit or not.

Substitution with on the Fly DFE Threshold Modification

Figure 12:
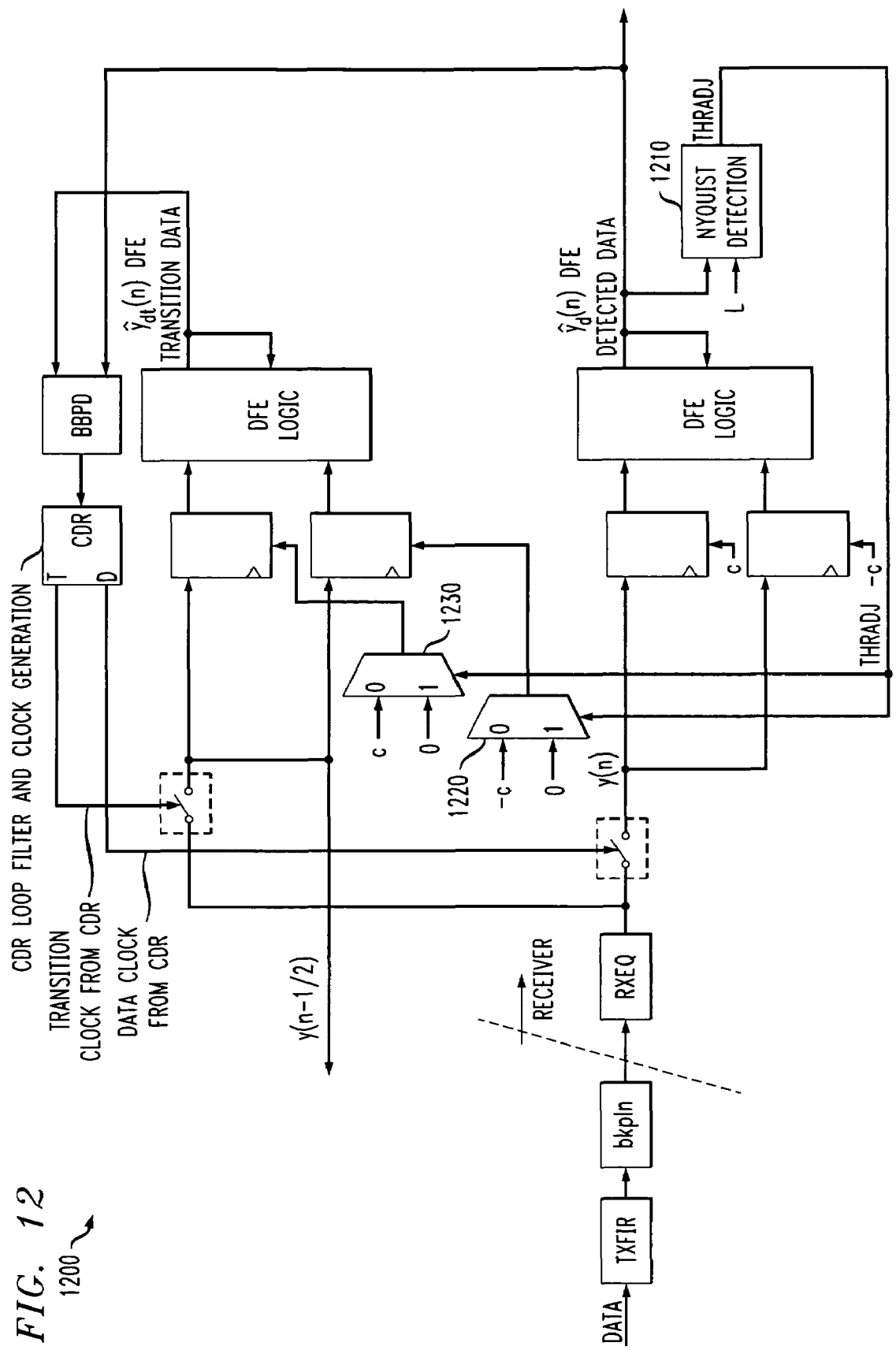
FIG. 12 is a block diagram of a serializer/deserializer communication channel that adjusts the thresholds of the transition latches upon detecting a Nyquist pattern.

FIG. 12 is a block diagram of a serializer/deserializer communication channel 1200 that adjusts the thresholds of the transition latches upon detecting a Nyquist pattern. The embodiment of FIG. 12 extends the channel 800 of FIG. 8 to a threshold adjustment mechanism 1220, 1230. A Nyquist pattern detector 1210 generates a threshold adjustment control signal, THRADJ, upon detecting a Nyquist pattern. The threshold adjustment control signal controls the operation of multiplexers 1220, 1230 that select a threshold of 0 at input 1 whenever a Nyquist pattern is detected, or select a threshold of c or −c at input 0 whenever a Nyquist pattern is not detected. The other elements of FIG. 12 operate in the same manner as the corresponding element in FIG. 8.

In the embodiment of FIG. 12, non-DFE corrected transition bit decisions are employed when the Nyquist pattern is detected. However, instead of using an extra DFE transition latch with threshold of zero, as in FIG. 9, the DFE threshold for the DFE transition latches (and possibly DFE data latches) are switched on the fly to zero. When it is determined that the run of Nyquist sequence has ended, the threshold is switched back to the normal operating threshold c. In the exemplary embodiment shown in FIG. 12, only the DFE transition latch thresholds are switched on the fly. In principle, the DFE data latch thresholds could similarly be switched on the fly, as would be apparent to a person of ordinary skill in the art.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

For example, various combinations of the features of the present invention can be implemented. For example, although the on the fly DFE threshold modification is shown in FIG. 12 based on Nyquist suppression, it could be modified to be based on DFE correction qualified Nyquist suppression. In addition, the phase detector need not be of the BBPD type described here. The phase detector can be comprised of any number of output levels and the corresponding additional input bits generated from clocks spaced at sub-multiples of the baud period. The CDR digital loop filter can be decimated or decimated in a parallel sampled fashion. The loop filter may or may not incorporate look ahead techniques.

The examples shown herein are for a 1 tap DFE only. This entire architecture can be extended with more complexity to additional DFE taps. The logic equations to generate $\hat{y}_{de}(n)$, $\hat{y}_{dt}(n)$, (or additional signals if considering a PD with more levels) will change accordingly. The DFE logic examples shown for the 1 tap DFE including logic to generate DFE transition, early, and late data for the DFE phase detectors assume an equivalent positive DFE coefficient (i.e., $b(1)=c$ where $c>0$). As would be apparent to one of ordinary skill in the art, the corresponding logic can be derived for $c<0$.

We claim:

1. A method for generating one or more clock signals in a receiver employing decision-feedback equalization, comprising:
sampling a received signal using a data clock and a transition clock to generate a data sample signal and a transition sample signal;
obtaining a DFE correction for each of said data sample and transition sample signals to generate DFE detected data and DFE transition data;
generating one or more phase updates of one or more of said data clock and said transition clock based on said DFE detected data and said DFE transition data; and
modifying one or more of said phase updates if said DFE detected data satisfies one or more predefined conditions.

2. The method of claim 1, wherein said one or more predefined conditions comprises the presence of a Nyquist pattern.

3. The method of claim 1, wherein said modifying step comprises the step of suppressing one or more of said phase updates.

4. The method of claim 3, wherein said suppression is performed only when said DFE detected data resulted from a DFE correction.

5. The method of claim 4, wherein said DFE correction occurs when the current DFE detected bit decision was made by complementing the previous DFE detected bit decision.

6. The method of claim 5, wherein said suppression is performed for a current bit and a next bit.

7. The method of claim 6, wherein said suppression is performed for a current bit and a next bit regardless of whether said next bit is part of a Nyquist pattern.

8. The method of claim 1, wherein said modifying step comprises the step of generating said one or more phase updates of one or more of said data clock and said transition clock based on said DFE detected data and non-DFE transition data.

9. The method of claim 1, wherein said modifying step comprises the step of adjusting one or more thresholds used to latch one or more of said data sample signal and said transition sample signal if said DFE detected data satisfies one or more predefined conditions.

10. The method of claim 9, wherein one or more thresholds are adjusted to a value of zero.

11. A receiver employing decision-feedback equalization, comprising:
a plurality of switches configured to sample a received signal using a data clock and a transition clock to generate a data sample signal and a transition sample signal;
at least one decision-feedback equalization (DFE) block configured to generate a DFE correction for each of said data sample and transition sample signals to generate DFE detected data and a DFE transition data;
a phase detector configured to generate a phase update of one or more of said data clock and said transition clock based on said DFE detected data and said DFE transition data; and
a pattern detector configured to enable a modification of one or more of said phase updates if said DFE detected data satisfies one or more predefined conditions.

12. The receiver of claim 11, wherein said one or more predefined conditions comprises the presence of a Nyquist pattern.

13. The receiver of claim 11, wherein said modification comprises the suppression of one or more of said phase updates.

14. The receiver of claim 13, wherein said suppression of one or more of said phase updates is performed by selecting a 0 value using a multiplexer.

15. The receiver of claim 13, further comprising a logic circuit configured to perform said suppression only when said DFE detected data resulted from a DFE correction.

16. The receiver of claim 15, wherein said suppression is performed for a current bit and a next bit.

17. The receiver of claim 16, wherein said suppression is performed for a current bit and a next bit regardless of whether said next bit is part of a Nyquist pattern.

18. The receiver of claim 11, wherein said modification comprises said phase detector generating a phase update of one or more of said data clock and said transition clock based on said DFE detected data and non-DFE transition data.

19. The receiver of claim 11, further comprising a multiplexer to adjust one or more thresholds used to latch one or more of said data sample signal and said transition sample signal if said DFE detected data satisfies one or more predefined conditions, wherein said one or more thresholds are adjusted to a value of zero.

20. A receiver employing decision-feedback equalization, comprising:
a plurality of switches configured to sample a received signal using a data clock and a transition clock to generate a data sample signal and a transition sample signal;
at least one decision-feedback equalization (DFE) block configured to generate a plurality of precomputed DFE corrections for each of said data sample and transition sample signals;
DFE logic configured to select one of said precomputed DFE corrections to generate said DFE detected data and said DFE transition data;
a phase detector configured to generate a phase update of one or more of said data clock and said transition clock based on said DFE detected data and said DFE transition data; and
a pattern detector configured to enable a modification of one or more of said phase updates if said DFE detected data satisfies one or more predefined conditions.

* * * * *